(12) United States Patent
Adkins

(10) Patent No.: US 9,912,801 B1
(45) Date of Patent: Mar. 6, 2018

(54) AUDIENCE RESPONSE SYSTEM AND METHOD OF USE

(76) Inventor: Kevin G. Adkins, Akron, OH (US)

( * ) Notice: Subject to any disclaimer, the term of this patent is extended or adjusted under 35 U.S.C. 154(b) by 1042 days.

(21) Appl. No.: 13/361,887

(22) Filed: Jan. 30, 2012

Related U.S. Application Data

(60) Provisional application No. 61/437,074, filed on Jan. 28, 2011.

(51) Int. Cl.
| | | |
|---|---|---|
| *H04B 1/00* | (2006.01) | |
| *H04B 7/00* | (2006.01) | |
| *G07C 13/00* | (2006.01) | |
| *H04M 1/725* | (2006.01) | |

(52) U.S. Cl.
CPC ........ *H04M 1/72552* (2013.01); *G07C 13/00* (2013.01)

(58) Field of Classification Search
CPC .............. G07C 13/00; H04M 1/72552; H04M 2250/62
USPC .......................................... 455/68, 69, 569.1
See application file for complete search history.

(56) References Cited

U.S. PATENT DOCUMENTS

| | | |
|---|---|---|
| 5,093,786 A | 3/1992 | Derks |
| 5,226,177 A | 7/1993 | Nickerson |
| RE35,449 E | 2/1997 | Derks |
| 5,724,357 A | 3/1998 | Derks |
| 5,823,788 A | 10/1998 | Lemelson et al. |
| 6,021,119 A | 2/2000 | Derks et al. |
| 6,289,222 B1 | 9/2001 | Cue et al. |
| 6,571,299 B1 | 5/2003 | Schroyer et al. |
| 6,665,000 B1 | 12/2003 | Buehler et al. |
| 6,895,213 B1 | 5/2005 | Ward |
| 7,277,671 B2 | 10/2007 | Glass et al. |
| 7,330,716 B2 | 2/2008 | Adkins |
| 7,715,780 B1 | 5/2010 | Beamish et al. |
| 7,747,261 B2 | 6/2010 | Derks |
| 8,326,210 B2 * | 12/2012 | Knowles et al. ............. 434/350 |

(Continued)

FOREIGN PATENT DOCUMENTS

| | | |
|---|---|---|
| EP | 1337127 A1 | 8/2003 |
| EP | 1427228 A2 | 6/2004 |
| WO | 2004017662 A2 | 2/2004 |

OTHER PUBLICATIONS

Jones, M. Cameron, et al., I-Vote: An Audience Voting System, CHI 2004, Apr. 24-29, 2004, Vienna, Austria.

(Continued)

*Primary Examiner* — Eugene Yun
(74) *Attorney, Agent, or Firm* — FisherBroyles, LLP

(57) ABSTRACT

An interface for an audience response system and method of operation is disclosed, The interface includes a receiving mechanism to receive transmissions from a plurality of hand-held audience response units programmed to transmit data according to a first transmission protocol in response to a user input, where the data comprises response data corresponding to the user input and unit data suitable to identify a particular user. The interface further includes logic to convert the data in the received transmissions into a data package for transmission according to a second transmission protocol, and to selectively control a transmitting mechanism to wirelessly transmit the data package, for example, over a wireless RF network, for example, Wi-Fi, Wi-Max and the like according to the second transmission protocol.

16 Claims, 3 Drawing Sheets

(56) References Cited

U.S. PATENT DOCUMENTS

| | | |
|---|---|---|
| 2002/0062276 A1 | 5/2002 | Krueger et al. |
| 2005/0244803 A1 | 11/2005 | Brown et al. |
| 2006/0072497 A1 | 4/2006 | Buehler et al. |
| 2007/0042724 A1 | 2/2007 | Derks |
| 2007/0064902 A1 | 3/2007 | Glass et al. |
| 2008/0108298 A1 | 5/2008 | Selen et al. |

OTHER PUBLICATIONS

Nordic Semiconductor ASA, Introduction to Wireless Networks, Sep. 2004, Norway.
Kinney, Patrick, ZigBee Technology: Wireless Control that Simply Works, Communications Design Conference, Oct. 2, 2003.

* cited by examiner

AUDIENCE RESPONSE SYSTEM AND METHOD OF USE

This application claims the benefit of U.S. Provisional Application No. 61/437,074 filed Jan. 28, 2011.

BACKGROUND

Audience response systems may be used to provide an interactive component to various instructional or informative environments. For example, an instructor may periodically assess a classroom's understanding of the instructional subject matter by inserting a query into a Microsoft PowerPoint, Open Office Impress or other presentation software applications. In another example, a meeting organizer may take "votes" from meeting members on meeting topics quickly and, if desirable, anonymously. In yet another example, tests or other assessments of subject matter mastery may be administered with an audience response system.

DESCRIPTION OF DRAWINGS

In the accompanying drawings which are incorporated in and constitute a part of the specification, embodiments are illustrated which, together with the detailed description given below, serve to describe exemplary embodiments. It will be appreciated that the illustrated boundaries of elements (e.g. boxes, groups of boxes, or other shapes) in the figures represent but exemplary boundaries. One of ordinary skill in the art will appreciate, for example, that one element may be designed as multiple elements or that multiple elements may be designed as one element. An element shown as an internal component of another element may be implemented as an external component and vice versa. The drawings may not be to scale and the proportion of certain elements may be exaggerated for purposes of illustration.

DETAILED DESCRIPTION

Figure 1:
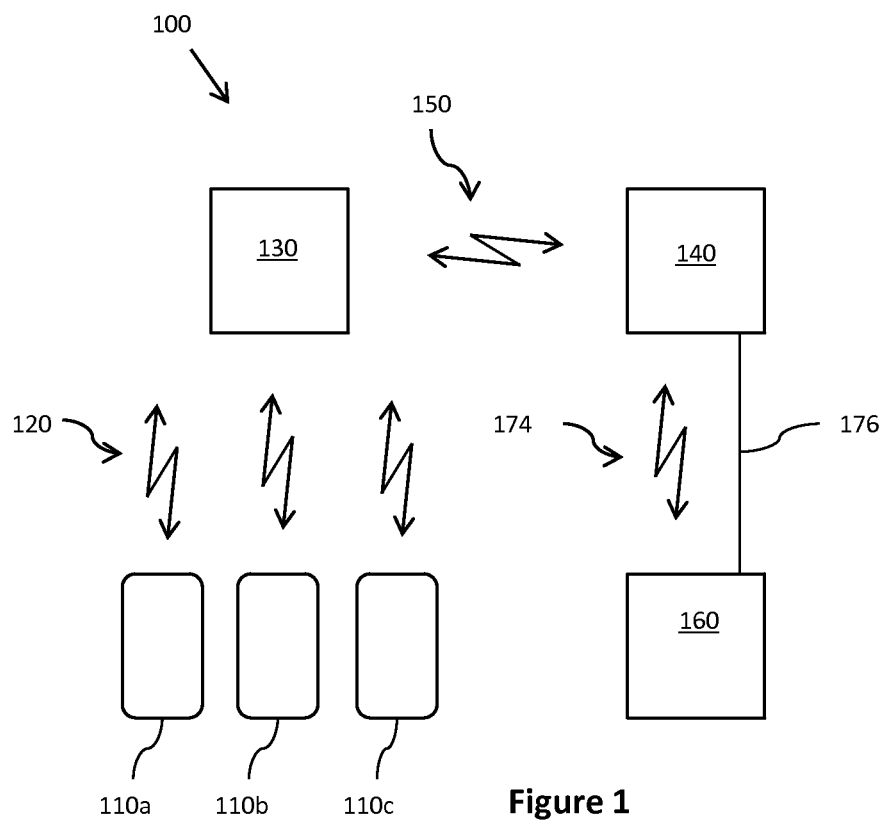
FIG. 1 is simplified system schematic diagram of exemplary components and communication paths between components in an audience response system.

The following description includes definitions of selected terms used throughout the disclosure. Both singular and plural forms of all terms fall within each meaning:

"Address", as used herein, includes but is not limited to one or more network accessible addresses, device identifiers, telephone numbers, IP addresses, url and ftp locations, e-mail addresses, names, a distribution list including one or more addresses, network drive locations, postal addresses, account numbers or other types of addresses that can identify a desired destination or device.

"Computer-readable medium", as used herein, refers to any medium that participates directly or indirectly in providing instructions and/or data to one or more processors for execution. Such a medium may take many forms, including but not limited to, non-volatile media, and volatile media. Non-volatile media may include, for example, optical or magnetic disks. Volatile media may include dynamic memory. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, or any other medium from which a computer, a processor or other electronic device can read.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical or optical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, student identifier, software, computers or other devices, audience response units or combinations of these.

Generally speaking, one embodiment of a system and method as used herein, includes but is not limited to an audience response system including an interface having a receiving mechanism to receive transmissions from a plurality of hand-held audience response units programmed to transmit data according to a first transmission protocol in response to a user input, where the data comprises response data corresponding to the user input and unit data suitable to identify a particular user or device. The interface further includes logic to convert the data in the received transmissions into a data package for transmission according to a second transmission protocol, and to selectively control a transmitting mechanism to wirelessly transmit the data package, for example, over a wireless RF network, for example, Wi-Fi, Wi-Max and the like according to the second transmission protocol.

FIG. 1 illustrates a simplified overview of one embodiment of an audience response system 100. In the illustrated embodiment, the system 100 includes at least one hand-held response unit 110a, 110b, 110c. As more completely described below, the hand-held response unit 110 includes a user interface to accept user input for transmission of a response signal in an audience response system. Response signal may include data such as a query identifier, user input, response unit identifier, time stamp and the like. Response signal may be communicated over a first path of signal communication 120, wireless or wireline. It is to be appreciated that the particular path of signal communication may employ any of a variety of signaling protocols including proprietary protocols depending at least in part on the hand-held response unit manufacturer. Additionally, the protocol may also include variations depending on the transmission media, such as wired or wireless including infrared and RF. It is to be further appreciated that the response signal may be transmitted over first path of signal communication 120 either synchronously or asynchronously, depending on the system configuration and communication protocol in use.

Following transmission from the hand-held response unit 110, the response signal may be received by at least one audience response interface 130 configured to receive the response signal on the first path of signal communication 120. Audience response interface 130 may then assemble the response data contained in response signal into a retransmission signal or optionally verify the data received and prepare an acknowledgement signal back to the hand-held response unit according to the protocol in place over the first path of signal communication 120. In the illustrated embodiment, retransmission signal may be transmitted over a second path of signal communication 150 for example a wireless, RF transmission over a local network operating under a standard such as that described by the IEEE 802.11 specification. In one embodiment, retransmission signal may include only data corresponding to a single response signal from a single hand-held response unit. Alternately or additionally, the retransmission signal may include data corresponding to a plurality of responses from one hand held response unit 110a or data corresponding to one or several responses from multiple hand-held response units 110a, 110b, 110c or a combination. Retransmission signal may be received by a router 140 or network switch over the second path of signal communication 150 and retransmitted to a control machine 160 over a third path of signal communication. As above, but illustrated separately here, the third path of signal communication may a wireless 174 or a wired 176 connection. Upon successful receipt and verification of the data package, control machine 160 may optionally transmit an acknowledgement signal over the third path of signal communication and the communication protocol in use.

Figure 2:
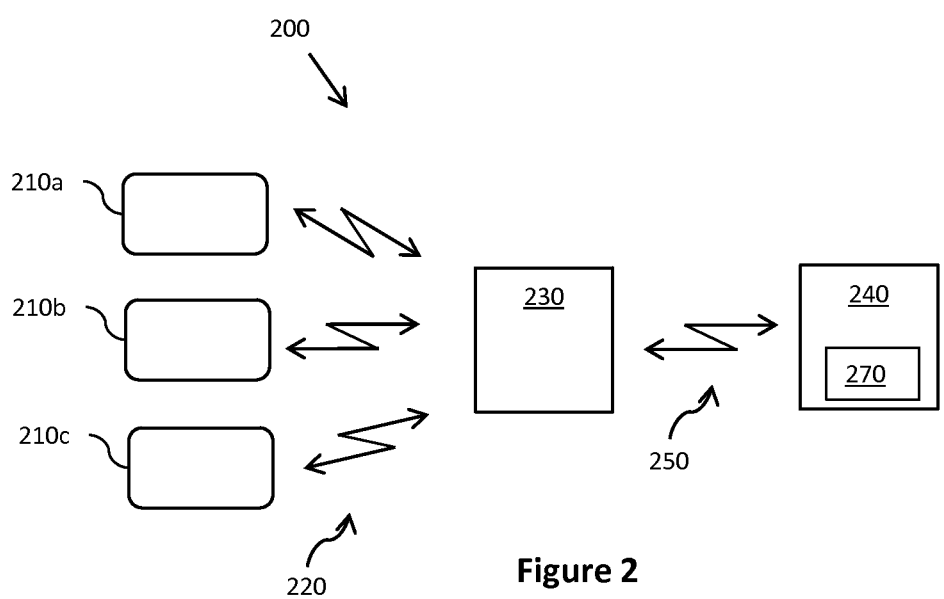
FIG. 2 is simplified system schematic diagram of exemplary components and communication paths between components in an alternate audience response system.

FIG. 2 illustrates an alternate embodiment of an audience response system 200. In the illustrated embodiment, the system 200 includes at least one hand-held response unit 210a, 210b, 210c. The hand-held response unit 210 includes a user interface to accept user input for transmission of a response signal in an audience response system. Such a response signal may include data such as a query identifier, user input, response unit identifier, time stamp and the like. Response signal may be communicated over a first path of signal communication 220, wireless or wireline. It is to be appreciated that the response signal may be transmitted over first path of signal communication 220 either synchronously or asynchronously, depending on the system configuration and communication protocol in use.

Following transmission from the hand-held response unit 210, response signal may be received by at least one audience response interface 230 configured to receive the response signal on the first path of signal communication 220. Audience response interface 230 may verify the received data and optionally prepare an acknowledgement signal for transmission back to the the hand-held response unit 210 over the first path of signal communication 220. Audience response interface 230 may assemble the response data contained in response signal into a retransmission signal. In the illustrated embodiment, retransmission signal may be transmitted over a second path of signal communication 240 for example a wireless, RF transmission over a local network operating under a standard such as that described by the IEEE 802.11 specification. In one embodiment, retransmission signal may include only data corresponding to a single response signal from a single hand-held response unit. Alternately or additionally, the retransmission signal may include data corresponding to a plurality of responses from one hand held response unit 210a or data corresponding to one or several responses from multiple hand-held response units 210a, 210b, 210c or a combination. Retransmission signal may be received by a control machine 250 on the second path of signal communication 240 configured as a wireless connection. Control machine 250 may include receipt logic 270 to verify the validity of disassembled data packages and prepare an acknowledgement signal, that could include an indication of an error condition requesting re-sending of the data package, for communication to the audience response interface 230 according to the second transmission protocol.

Figure 3:
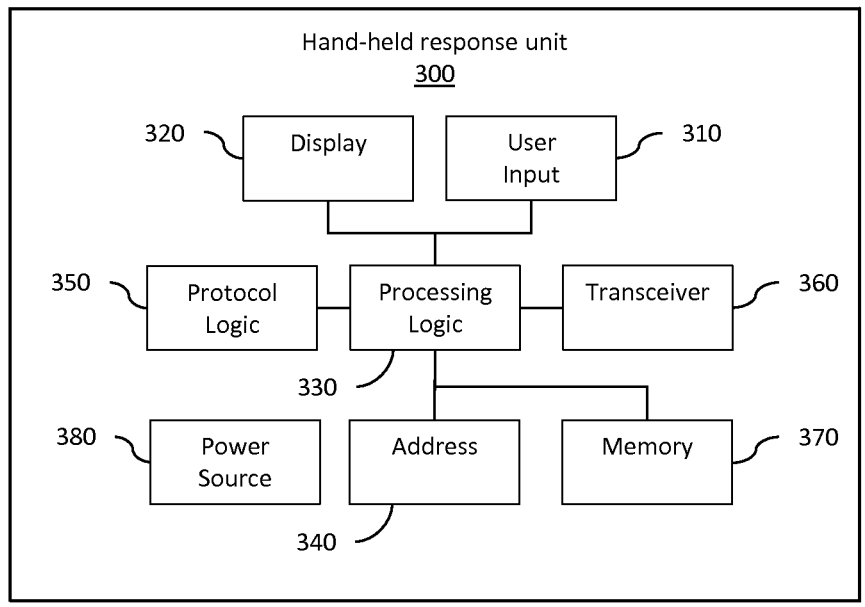
FIG. 3 is functional block diagram of an exemplary hand-held response unit.

FIG. 3 depicts a simplified, block diagram of an exemplary hand-held response unit 300. Response unit 300 may include a user input 310 such as a numeric/alpha key pad, keyboard, point and click, microphone, graphical user interface and other user inputs now known or subsequently developed. Response unit 300 may include a display 320 ranging from relatively simple LED-type status lights, to a LCD or flat screen display, to a touchscreen interface/capacitive input screen capable of functioning as both the query display and the user input 310. Processing logic 330, for example an application specific integrated circuit (ASIC), may be programmed to control the response unit. For example, in response to a query displayed in the class or meeting room or, alternately on display 320, or both, a user may enter a response to the queried prompt on the user input 310. Processing logic 330 may format the response and other desired data such as the response unit address 340. Processing logic 330 may further cause transmission of the formatted response using a transmission protocol 350 via a transmission mechanism 360 such as the illustrated transceiver. Optionally, the processing logic 330 may cause the formatted response to be saved in memory 370 for later retrieval or retransmission. Power for the response unit may be provided from a power source 380 such as a battery or plug.

In one embodiment, response unit 300 is configured as a single use device for use substantially only in connection with an audience response system, such as those proprietary systems available from Fleetwood Group, Inc., Turning Technologies, iClicker and the like. As is now readily apparent however, response unit 300 functionality may be a selected mode or provided function of a more multi-function device such as a so-called "smart phone," an identification device, calculator, a computer tablet, or a stand-alone computer system with programmed logic and protocol provided via download or separately installed control software.

Figure 4:
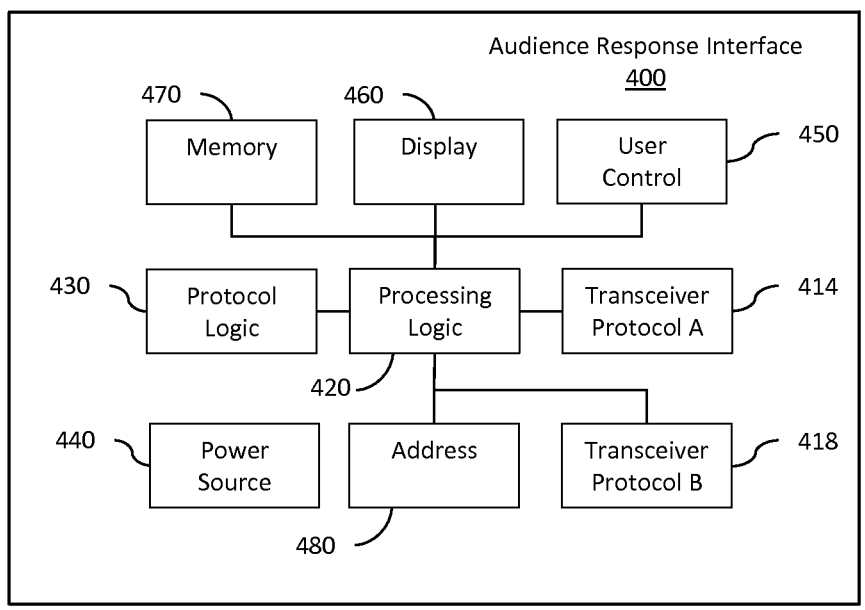
FIG. 4 is functional block diagram of an exemplary audience response interface.

FIG. 4 depicts a simplified, block diagram of an exemplary audience response interface 400. In a simple form, audience response interface 400 includes a first transmitting/receiving mechanism 414 for communications with the hand-held response unit according to the first transmission protocol and a second transmitting/receiving mechanism 418 for communications according to another, second transmission protocol. Optionally separate transmitters and receivers may be employed to achieve the function of the transmitting/receiving mechanisms. Processing logic 420 may convert the received data substantially as it is received from a hand-held response unit into a data package compliant with the second transmission protocol. Various protocols may be stored in protocol logic 430, for example, TCP/IP, FTP, HTTP, telnet, SSH, sms, UDP and the like for appropriate application to the protocol in use over a selected communications path. Logic may further control transmission of the data package through the transmitting/receiving mechanism 418 to a controller computer, such as the instructor's device. Power for the response interface 400 may be provided from a power source 440 such as a battery or plug.

In another embodiment, an exemplary audience response interface 400 may aggregate hand-held responses over a certain time frame or until a certain number of responses are received. The responses may be aggregated into a single data package and communicated through the second transmitting/receiving mechanism 418 over the second transmission protocol in batches.

In another embodiment, an exemplary audience response interface 400 includes user control 450 to select options such as powering unit on/off, selecting operational mode, or selecting the protocol(s) in use such as hand-held unit protocol (i.e. which proprietary system is in use) or retransmission protocol. The user selection may be selected by, among others, a multiple position rotary switch, push button, slide switch, or displayed on a graphic display 460.

One selected operational mode may be a storage function where responses from hand-held units may be time stamped and stored in a memory 470. At the conclusion of a meeting, or an instructional or testing session, the stored records may be transmitted in bulk through the second transmitting/receiving mechanism 418 over the second transmission protocol with optional response interface address data 480. In such a storage mode, the audience response interface 400 may be used for recording responses in the audience setting. This mode can be employed in certain mobile or temporary settings where data storage is desirable.

Figure 5:
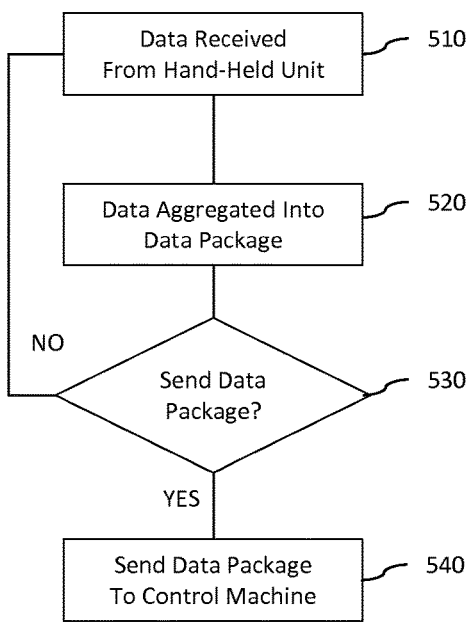
FIG. 5 is a simplified flow chart of an embodiment of a method of using an audience response interface.

FIG. 5 illustrates a flow diagram for an exemplary method 500 for using an audience response system. In use, data is received from a hand-held response unit over a first path of signal communication, step 510. The receipt of data may be synchronized by a polling signal or request transmitted to the hand-held response unit or the receipt of data may be initiated asynchronously by the hand-held response unit. The received data may then be aggregated into a data package, step 520. The data package may include data corresponding to a single response signal from a single hand-held response unit. Alternately or additionally, the data package may include data corresponding to a plurality of responses from one hand held response unit 110a, 210a or data corresponding to one or several responses from multiple hand-held response units 110a, 110b, 110c, 210a, 210b, 210c or a combination. If the aggregated data package is to be sent, step 530, it is transmitted to a control machine, step 540, for example the leader of the presentation, instructor or grader, either directly or through an intermediate device such as a router, network switch, or mesh network.

Figure 6:
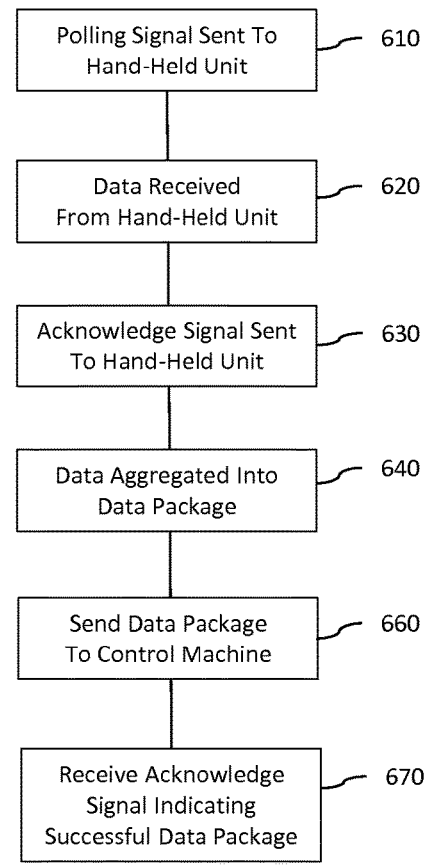
FIG. 6 is a simplified flow chart of an embodiment of a method of using an audience response interface.

FIG. 6 illustrates a flow diagram for an exemplary method 600 of use for an audience response system. Optionally, in a polling or non-hand-held initiated system, a polling or synchronizing signal may be sent, step 610, to a particular hand-held response unit or to a plurality of hand-held response units. Data may be received from a hand-held response unit over a first path of signal communication, step 620, in response to the optional polling or synchronizing signal or without prompting in an asynchronous system. An acknowledgement signal may be sent to the hand-held response unit over the first path of signal communication, step 630. Such acknowledgement signal may indicate to the hand-held response unit to cease its data transmissions and indicate to a user that the response has been received. The received data may then be aggregated into a data package, step 640, or sent immediately without aggregating several responses into a single data package. Where a plurality of individual hand-held response unit responses are aggregated, the data package may include data corresponding to a plurality of responses from one hand held response unit or data corresponding to one or several responses from multiple hand-held response units or a combination. The aggregated data package may then be sent to a control machine, step 660, for example a laptop, pad, phone or other multi-function computer or, in the alternative, a device tailored to collect audience responses. Communication of the aggregated data package may occur either directly over a second path of signal communication, for example via a Wi-Fi network or over a third path of signal communication through an intermediate device such as a router, network switch, or mesh network generally receiving the aggregated data package over the second path of signal communication. Optionally, an acknowledgement signal may be received indicating successful receipt of the data package by the control machine, step 670. In another embodiment, the acknowledge signal sent at step 630 may occur after receipt of the acknowledge signal at step 670.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

The invention claimed is:

1. An audience response system comprising:

A plurality of hand •held audience response units programmed to transmit data over a first path of signal communication according to a first transmission protocol in response to a user input, where the data comprises response data corresponding to the user input and unit data suitable to identify a particular user;

An audience response interface configured for (i) receipt of wirelessly transmitted data over the first path of signal communication, (ii) conversion of wirelessly transmitted data from at least one hand •held response unit into a data package for transmission over a second path of signal communication according to a second transmission protocol, and (iii) wireless communication of the data package over the second path of signal communication;

A control machine configured to receive the data package, disassemble the data package to obtain data corresponding to the user input and unit data suitable to identify a particular user; and Receipt logic within the control machine, where the receipt logic verifies validity of the disassembled data package and wirelessly transmits an acknowledgment over the second path of signal communication according to the second transmission protocol to the audience response interface.

2. The audience response system as set forth in claim 1, further comprising logic within the audience response interface, where the logic synchronizes receipt of the data from the plurality of hand •held audience response units.

3. The audience response system as set forth in claim 1, further comprising logic within the audience response interface, where the logic asynchronously receives the data from the plurality of hand •held audience response units.

4. The audience response system as set forth in claim 1, further comprising logic within the audience response interface, where the logic selectively receives the data from the plurality of hand-held audience response units synchronously and asynchronously.

5. The audience response system as set forth in claim 1, further comprising logic within the audience response interface, where the logic wirelessly transmits an acknowledgment signal in response to receipt of wirelessly transmitted data from a particular hand-held audience response unit over the first path of signal communication according to the first transmission protocol.

6. The audience response system as set forth in claim 5, where the acknowledgement signal comprises unit data.

7. The audience response system as set forth in claim 1, further comprising logic within the audience response interface, where the logic wirelessly transmits an acknowledgment signal identifying at least one hand-held response unit over the first path of signal communication according to the first transmission protocol.

8. An interface for an audience response system comprising:

A receiving mechanism to receive transmissions from a plurality of hand-held audience response units programmed to transmit data according to a first transmission protocol in response to a user input, where the data comprises response data corresponding to the user input and unit data suitable to identify a particular user; and Logic to convert the data in the received transmissions into a data package for transmission according to a second transmission protocol, and to selectively control a transmitting mechanism to wirelessly transmit the data package according to the second transmission protocol;

Where the logic receives an acknowledgement signal from a control machine according to the second transmission protocol indicative of successful receipt of transmitted data package.

9. The interface as set forth in claim 8, where the logic synchronously controls receipt of the transmissions from the plurality of hand-held audience response units.

10. The interface as set forth in claim 8, where the logic communicates an acknowledgement signal to a hand •held audience response unit according to the first transmission protocol indicative of successful receipt of transmitted data.

11. The interface as set forth in claim 8, where the logic converts data in the received transmissions of a plurality of hand-held audience response units into a single data package.

12. The interface as set forth in claim 8, further comprising a user control permitting a user to select the first transmission protocol.

13. A method of interfacing a plurality of hand-held response units and a control machine configured to collect responses from the hand •held response units, the method comprising:

Receiving transmissions from a plurality of hand-held audience response units programmed to transmit data according to a first transmission protocol in response to a user input, where the transmissions are received over a first path of signal communication according to a first transmission protocol and comprise response data corresponding to the user input and unit data suitable to identify a particular user;

Converting the data in the received transmissions into a data package for transmission according to a second transmission protocol;

Selectively controlling a transmitting mechanism to wirelessly transmit the data package over a wireless RF path of signal communication according to the second transmission protocol; and Receiving an acknowledgement signal from a control machine according to the second transmission protocol indicative of successful receipt of transmitted data package.

14. The method as set forth in claim 13, further comprising synchronously controlling receipt of the transmissions from the plurality of hand •held audience response units.

15. The method as set forth in claim 13, further comprising communicating an acknowledgement signal to a hand-held audience response unit according to the first transmission protocol indicative of successful receipt of transmitted data.

16. The method as set forth in claim 13, further comprising user selecting one of the first transmission protocol and the second transmission protocol.

* * * * *